Patented July 13, 1948

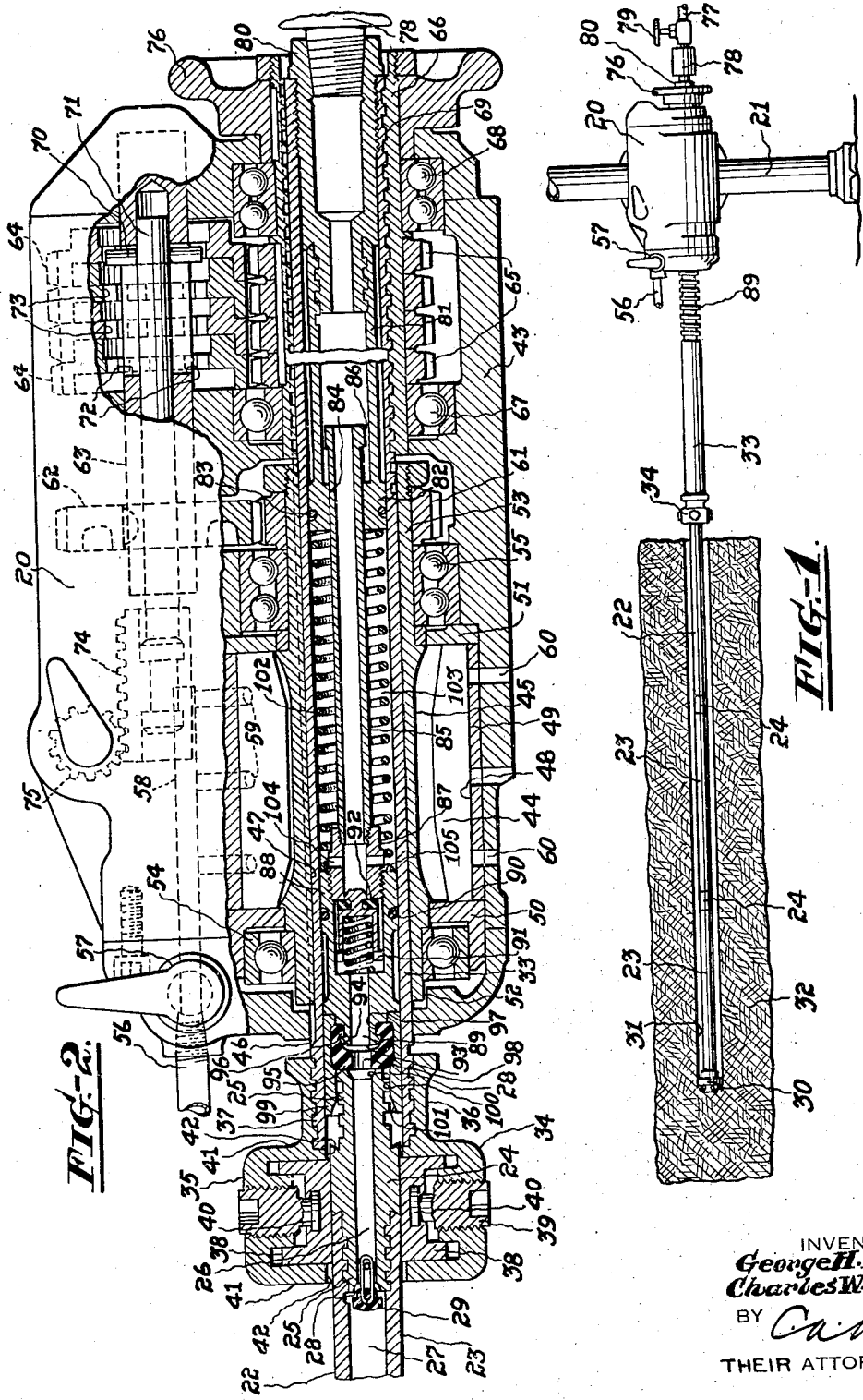

2,445,218

UNITED STATES PATENT OFFICE 2,445,218

DRILLING MACHINE

George H. Fuehrer, Phillipsburg, N. J., and Charles W. Hosking, Easton, Pa., assignors to Ingersoll-Rand Company, New York, N. Y., a corporation of New Jersey Application December 21, 1945, Serial No. 636,440

9 Claims. (Cl. 255—49)

This invention relates to drilling machines, and more particularly to drilling machines of the rotary type having means for supplying cleansing fluid to the cutting bit for cooling it and to remove the rock cuttings from the working surface.

One object of the invention is to enable the connection between the working implement and the elements conveying cleansing fluid thereto to be quickly established.

Another object is to avoid the leakage of cleansing fluid from the drilling machine.

A more specific object is to utilize the pressure of the cleansing fluid as a force for maintaining a fluid tight joint between the working implement and the cleansing fluid supply elements.

Other objects will be in part obvious and in part pointed out hereinafter.

In the accompanying drawings and in which similar reference numerals refer to similar parts, Figure 1 is a side elevation of a drilling machine embodying the invention and arranged upon a column for drilling a horizontal hole, and Figure 2 is an enlarged view in longitudinal elevation, and partly broken away, of the drilling machine.

Referring more particularly to the drawings, 20 designates, in general, a drilling machine mounted upon a column 21 for rotating and imparting feeding movement to a working implement 22.

The working implement consists of a plurality of tubular rod sections 23 that are joined together by connectors 24 having stems 25 at their opposed ends threaded into the rod sections 23, and each connector has a passage 26 therethrough to afford communication between passages 27 of the adjacent rod sections 23. The ends of the passages 26 are tapered to provide valve seats 28, and the valve seat at the downstream end of each passage 26 cooperates with a check valve 29 to prevent the return flow of cleansing fluid from the working implement toward the drilling machine.

One end of the rod assembly carries a cutting bit 30 shown as being of the diamond type, for drilling a hole 31 in the rock 32, and the opposite end of the working implement is secured to the feed screw 33 of the drilling machine by a chuck 34. The chuck is threadedly connected to the feed screw 33, its casing 35 having an internally threaded stem 36 to receive the threaded end 37 of the feed screw, and in the casing 35 are a plurality of radially movable jaws 38 to grip the working implement. These jaws are actuated for engagement and disengagement with the working implement by screws 39, in the wall of the casing 35, having heads 40 at their inner ends interlockingly connected with the jaws in such wise that the jaws may be retracted from their implement gripping positions by the screws. The jaws are guided by the end walls 41, and in said end walls are apertures 42 of ample size to permit of the working implement being readily inserted into the chuck.

The feed screw 33 extends entirely through the casing 43 of the drilling machine and has a range of movement endwise approximately equal to the length of a rod section 23. Owing to this arrangement, whenever the chuck 34 is disconnected from the working implement and retracted to the limit of the backing-off movement of the feed screw a rod section 23 may be conveniently inserted into the chuck and threaded to the working implement without necessitating the shifting of the drilling machine out of alignment with the drill hole.

The feed screw, moreover, passes axially through the motor serving to rotate the working implement and this motor, designated in its entirety by 44, is positioned in the forward end of the casing 43. It is of the rotary sliding vane type and its rotor 45 is in splined engagement with the feed screw so that the working implement will rotate at the speed of the rotor and will be capable of passing endwise through it. The feed screw is accordingly provided, in its periphery, with a series of grooves 46, only one being shown, that extend longitudinally from the rear end of the feed screw to a point adjacent the stem 36 of the chuck, and on the inner surface of the rotor are ribs 47 that are slidable in the grooves 46 and are preferably of the same length as the rotor.

The chamber 48 containing the rotor 45 is defined by a bushing 49 and plates 50 and 51 inserted in the casing 43 to form closures for the ends of the chamber 48. At the ends of the rotor are annular trunnions 52 and 53 that extend through the plates 50—51, respectively, and into anti-friction bearings 54 and 55.

The pressure fluid serving to actuate the rotor is conveyed to the drilling machine from a source of supply by a conduit 56 threadedly connected to the casing 43, and a throttle valve 57 controls the flow of such pressure fluid into an inlet passage 58 leading to the chamber 48 and communicating therewith through a plurality of ports 59. The exhaust fluid passes from the chamber 48 to the atmosphere through ports 60 in the bushing 49 and the wall of the casing 43.

As has been hereinbefore indicated, the rotor also provides the force required for advancing the working implement toward the work. To this end the trunnion 53 carries a gear 61 to mesh with a gear 62 keyed to a hollow shaft 63 journaled in the casing 43 and arranged in parallelism with the feed screw 33. A group of driving gears 64 are arranged on the shaft 63 to mesh with gears 65 keyed to a feed nut 66 for the feed screw, said feed nut 66 being suitably supported by anti-friction bearings 67 and 68, and being threaded internally for cooperation with the threads 69 of the feed screw 33.

The gears 64 differ from each other in the number of teeth to permit of rotation of the feed nut 66 at different speeds and are selectively interlocked with the shaft 63 for rotation therewith by a key 70 carried by a plunger 71 reciprocable in the shaft 63. The key 70 is slidable in slots 72 in the opposed sides of the shaft 63 and its ends project from the shaft 63 for engagement with key slots 73 in the gears 64.

The plunger 71 is shifted manually by means of a rack 74 and a pinion 75 meshing therewith, and is suitably interlocked with the rack to preclude relative endwise movement between the two and to permit of rotational movement of the plunger with respect to the rack.

Owing to the arrangement of the gears 64—65 and with the key 70 occupying a position to connect a gear 64 to the shaft 63 the feed nut 66 will be rotated in a manner well known in the art to advance the working implement at a desired rate of feeding movement, depending upon which of the gears 64 is thus interlocked with the shaft 63. Reverse movement of the feed nut 66, for retracting the feed screw may be effected manually through the instrumentality of a handwheel 76 interlockingly connected to the rearward end of the feed nut 66.

The fluid serving to cool the drilling bit and to flush cuttings from the drill hole passes through the feed screw and is conveyed thereto by a supply conduit 77 connected to a swivel 78. The conduit 77 is controlled by a valve 79, and the swivel 78 is threaded into a hollow plug 80 screwed into the rearward end of the feed screw. The inner end of the hollow plug is threadedly connected to a tube 81 having a head 82 at its free end, and in the periphery of said head is an annular packing member 83 to effect a seal between the inner surface of the feed screw and the head 82.

In the central portion of the head 82 is an aperture 84 through which extends, slidably, a tube 85 having an external flange 86 that lies within the tube 81 and cooperates with the head 82 to limit movement of the tube 85 in the direction of the working implement 22. The front end of the tube 85 is threaded into an end of a hollow connector 87 the opposite end of which is similarly connected to a body 88 having a passage 89 therethrough to convey cleansing fluid from the connector to the passage 26 of the working implement. The body 88 has a slide fit in the feed screw 33, and in its periphery is an annular sealing member 90 to prevent leakage of cleansing fluid along the surface of the body through the front end of the feed screw.

As a preferred arrangement, the end of the passage 89 adjacent the connector 87 is enlarged to provide a cavity 91 for the accommodation of a spring-pressed check valve 92 that serves to close the forward end of the connector to prevent the flow of cleansing fluid from the drilling implement into the liquid conveying elements lying rearwardly of the body 88.

The front end portion of the body is in the form of a reduced stem 93 that extends into a cavity 94 of an annular resilient sealing member 95 having an introverted flange 96 that lies in an annular groove 97 in the periphery of the stem 93 for connecting the sealing member 95 to the body. The sealing member 95 has a passage 98 to afford communication between the passages 89 and 26, and the forward end of the sealing member 95 seats against the adjacent end of the working implement to prevent leakage of cleansing fluid thereacross and through the chuck 34.

The sealing member is encased by a sleeve 99 which is suitably connected to the forward portion of the body 88. The bore 100 of the sleeve 99 lying forwardly of the sealing member 95 is proportioned to readily accommodate the end of the working implement and the entrance end 101 of the bore 100 is flared to facilitate the insertion of the working implement into the bore 100. The body and the parts connected thereto are urged forwardly, to place the sealing member 95 in position for engagement with the working implement, by a spring 102 interposed between the head 82 and the body 88.

The space containing the spring 102 constitutes a pressure chamber 103 which is defined by the body 88, the head 82 and the tube 85, and cleansing fluid under pressure is admitted into said pressure chamber 103 by ports 104 in the connector 87 to act against a pressure surface 105 on the body 88 for actuating the sealing member 95 in a forwardly direction. The pressure of the fluid acting against the pressure surface 105, coupled with that acting against the free end of the tube 85 and the force exerted by the spring 102, will press the sealing member 95 firmly into engagement with the working implement so that none of the cleansing fluid will escape to the exterior of the drilling machine.

In the operation of the device, let it be assumed that the feed screw 33 is in the retracted position in which it is placed preparatory to the starting of a drilling operation and that the sealing member 95 is in its foremost limiting position wherein the flange 86 of the tube 85 engages the head 82. The end of a rod section 23, having a connector 24 attached thereto, is then inserted into the chuck sleeve 99 against the sealing member 95. A seal is thereby conveniently established and will thereafter be effectively maintained by the spring 102 when the rod and the tube assembly are moved rearwardly through the range necessary to permit the opposite end of the rod section to be brought into alignment with the drilling implement and during the reverse movement of the rod section incident to the threading thereof to the drilling implement.

After the drilling implement has been thus lengthened and with the parts so positioned that the flange 86 is spaced a suitable distance above the head 82, this being the position it should occupy in order that the movable tubular parts in the feed screw may have freedom of movement for assuring the necessary pressure of the sealing member 95 against the working implement, the jaws 38 will be actuated into gripping engagement with the working implement to connect the two securely together. The valve 79 is then opened to communicate the passages in the feed screw and the working implement with the source of cleansing fluid supply. Some of this fluid will enter the pressure chamber 103 and will act against the pressure surface 105 for pressing the sealing member 95 firmly into engagement with the opposed surfaces of the working implement in the body 88 and, of course, also with the inner surface of the sleeve 99 containing the sealing member.

In practice, the present invention has been found to be a highly efficient device for quickly establishing communication between the cleansing fluid supply and the passage in the working implement and also to quickly and effectively establish a seal between these parts. This, as will be readily appreciated, is accomplished by the simple acts of inserting the working implement into the drilling machine and communicating the celansing fluid conveying passage with the source of supply.

We claim:

1. A drilling machine, comprising a tubular rotary feed screw, a working implement coaxial with the feed screw and having a passage therethrough, sealing means in the feed screw to seat against the working implement having an aperture to register with and convey cleansing fluid into the passage and being subjected to the pressure of such cleansing fluid for pressing said sealing means against the working implement, and means for securing the working implement to the feed screw.

2. A drilling machine, comprising a tubular feed screw, means for actuating the feed screw, a working implement coaxial with the feed screw and having a passage therethrough, means slidable endwise in the feed screw for conveying cleansing fluid to the passage, a sealing member interposed between the said means and the working implement, a pressure surface on the said means subjected to the pressure of the cleansing fluid for applying pressure to the sealing member, and means for securing the working implement to the feed screw.

3. A drilling machine, comprising a tubular feed screw, means for actuating the feed screw, a working implement extending at one end into the feed screw and having a passage therethrough, means in the feed screw for conveying cleansing fluid to the passage and being movable axially of the feed screw, a sealing member on said means to engage the working implement for preventing the leakage of cleansing fluid to the exterior of the working implement, a pressure surface on the said means subjected to the pressure of the cleansing fluid for pressing the sealing member against the working implement, and means for securing the working implement to the feed screw.

4. A drilling machine, comprising a tubular feed screw, means for actuating the feed screw, a working implement extending at one end into the feed screw and having a passage therethrough, means slidable in the feed screw for conveying cleansing fluid to the passage, a sealing member in the periphery of said means to engage the wall of the feed screw for preventing the leakage of fluid from the feed screw, a sealing member between the said means and the working implement to prevent the leakage of fluid to the exterior of the working implement, a pressure surface on the said means subjected to the pressure of the cleansing fluid for pressing the second mentioned sealing member into sealing engagement with the working implement and the said means, and means for securing the working implement to the feed screw.

5. A drilling machine, comprising a tubular rotary feed screw, a working implement extending at one end into the feed screw and having a passage therethrough, a conduit in the feed screw for conveying cleansing fluid to the passage and being movable endwise to permit insertion of the working implement into the feed screw, a sealing member between the conduit and the working implement having an aperture for the passage of cleansing fluid from the conduit to the passage, a spring to move the conduit in the direction of the working implement, a pressure surface on the conduit subjected to the pressure of the cleansing fluid to augment the force of the spring for applying pressure to the sealing member, and means for securing the working implement to the feed screw.

6. A drilling machine, comprising a tubular rotary feed screw, a working implement extending at one end into the feed screw and having a passage therethrough, a conduit for conveying cleansing fluid to the working implement and being movable endwise in the feed screw, a sealing member to prevent leakage of cleansing fluid across the opposed surfaces of the working implement and the conduit, means cooperating with the conduit and the feed screw to define a pressure chamber in the feed screw, there being a port in the conduit for the passage of cleansing fluid into the pressure chamber, sealing members in the conduit and the said means to cooperate with the feed screw for preventing leakage of fluid from the pressure chamber, a pressure surface on the conduit subjected to the pressure of the fluid in the pressure chamber for applying pressure to the first mentioned sealing member, and means for securing the working implement to the feed screw.

7. A drilling machine, comprising a tubular rotary feed screw, a working implement extending at one end into the feed screw and having a passage therethrough, a spring-pressed conduit in the feed screw for conveying cleansing fluid to the working implement and being movable endwise therewith in accordance with variations in the extent of penetration of the working implement into the feed screw, a sealing member to form a fluid tight joint between the conduit and the working implement, means cooperating with the conduit and the feed screw to define a pressure chamber in the feed screw, a pressure surface on the conduit subjected to the pressure of the fluid in the pressure chamber for clamping the sealing member between the conduit and the working implement, sealing members in the conduit and the said means to prevent leakage of fluid from the ends of the pressure chamber, and means for limiting endwise movement of the conduit in the feed screw.

8. A drilling machine, comprising a tubular rotary feed screw, a working implement coaxial with the feed screw and having a passage therethrough, sealing means movable axially of the feed screw for sealing engagement with the end of the working implement having an aperture to convey cleansing fluid to the passage and being subjected to fluid under pressure for maintaining said sealing means in sealing engagement with the working implement, and means for securing the working implement to the feed screw.

9. A drilling mechanism, comprising a tubular rotary feed screw, a working implement coaxial with the feed screw and having a passage therethrough, sealing means movable axially of the feed screw for sealing engagement with the end surface of the working implement having an aperture to convey cleansing fluid to the passage, a spring in the feed screw to press the sealing member against the working implement, and means for securing the working implement to the feed screw.

GEORGE H. FUEHRER.
CHARLES W. HOSKING.

REFERENCES CITED

The following references are of record in the file of this patent:

UNITED STATES PATENTS

| Number | Name | Date |
|---|---|---|
| 1,113,397 | Wright | Oct. 13, 1914 |
| 2,299,881 | Demo | Oct. 27, 1942 |

FOREIGN PATENTS

| Number | Country | Date |
|---|---|---|
| 23,518 | Great Britain | Nov. 3, 1908 |